United States Patent
Chen et al.

(10) Patent No.: US 10,890,667 B2
(45) Date of Patent: Jan. 12, 2021

(54) CUBATURE KALMAN FILTERING METHOD SUITABLE FOR HIGH-DIMENSIONAL GNSS/INS DEEP COUPLING

(71) Applicant: SOUTHEAST UNIVERSITY, Nanjing (CN)

(72) Inventors: Xiyuan Chen, Nanjing (CN); Bingbo Cui, Nanjing (CN); Wei Wang, Nanjing (CN); Zhengyang Zhao, Nanjing (CN); Lin Fang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 190 days.

(21) Appl. No.: 16/094,474

(22) PCT Filed: Apr. 13, 2017

(86) PCT No.: PCT/CN2017/080383
§ 371 (c)(1),
(2) Date: Oct. 18, 2018

(87) PCT Pub. No.: WO2018/014602
PCT Pub. Date: Jan. 25, 2018

(65) Prior Publication Data
US 2019/0129044 A1    May 2, 2019

(30) Foreign Application Priority Data

Jul. 19, 2016  (CN) .......................... 2016 1 0575270

(51) Int. Cl.
*G01S 19/47*   (2010.01)
*G01C 21/16*   (2006.01)
(Continued)

(52) U.S. Cl.
CPC .............. *G01S 19/47* (2013.01); *G01C 21/16* (2013.01); *G01S 5/0294* (2013.01); *G01C 21/165* (2013.01); *G01C 21/20* (2013.01)

(58) Field of Classification Search
CPC ...... G01C 21/16; G01C 21/165; G01C 21/20; G01S 19/47; G01S 5/0294
(Continued)

(56) References Cited

U.S. PATENT DOCUMENTS 7,149,629 B1* 12/2006 Scherzinger ......... G01C 21/165
                                                    702/5
8,825,396 B2*  9/2014 Scherzinger ......... G01C 21/165
                                                    701/469
(Continued)

FOREIGN PATENT DOCUMENTS

CN   105737823 A    7/2016
CN   106291645 A    1/2017
WO   2015081424 A1  6/2015

OTHER PUBLICATIONS

Li et al., Strong Tracking Cubature Kalman Filter Algorithm for GPS/INS Integrated Navigation System Proceedings of 2013 IEEE International Conference on Mechatronics and Automation, Aug. 4-7, 2013, pp. 1113-1117.*
(Continued)

*Primary Examiner* — Chuong P Nguyen
(74) *Attorney, Agent, or Firm* — Bayramoglu Law Offices LLC (57) ABSTRACT

The present invention discloses a cubature Kalman filtering method suitable for high-dimensional GNSS/INS deep coupling, including: S1, constructing a high-dimensional GNSS/INS deep coupling filter model; S2, generating an initialization cubature point for the constructed filter model by using standard cubature rules; S3, performing CKF filtering by using novel cubature point update rules. The
(Continued)

present invention is suitable for high-dimensional GNSS/INS deep coupling filtering with high precision and high stability.

6 Claims, 2 Drawing Sheets

(51) Int. Cl.
 *G01S 5/02* (2010.01)
 *G01C 21/20* (2006.01)
(58) Field of Classification Search
 USPC .......................... 342/357.3, 357.32; 701/480
 See application file for complete search history.

(56) References Cited

U.S. PATENT DOCUMENTS

| | | | |
|---|---|---|---|
| 9,062,978 B2* | 6/2015 | Win | G01C 21/165 |
| 10,564,296 B2* | 2/2020 | Hide | G01S 19/13 |
| 2009/0132164 A1* | 5/2009 | Goodall | G01C 21/165 |
| | | | 701/469 |
| 2018/0120111 A1* | 5/2018 | Petillon | G01C 21/165 |
| 2020/0124421 A1* | 4/2020 | Kang | G01C 21/165 |

OTHER PUBLICATIONS

Arasaratnam et al., Cubature Kalman Filters IEEE Transactions on Automatic Control, vol. 54, No. 6, Jun. 2009.*

Zhang Xinchun, Research on the Nonlinearity of INS/GNSS Deeply Integration, Electronic Technology & Information Science, China Master' S Theses Full-Text Database, No. 03, Mar. 15, 2016 (Mar. 15, 2016).

Liu Jiang et. al, A CKF based GNSS/INS Train Integrated Positioning Method, Proceedings of the 2010 IEEE International Conference on Mechatronics and Automation, Aug. 7, 2010 (Aug. 7, 2010), chapters I-IV.

* cited by examiner

CUBATURE KALMAN FILTERING METHOD SUITABLE FOR HIGH-DIMENSIONAL GNSS/INS DEEP COUPLING

CROSS REFERENCE TO RELATED APPLICATIONS

This application is the national phase entry of International Application No. PCT/CN2017/080383, filed on Apr. 13, 2017, which is based upon and claims priority to Chinese Patent Application No. 201610575270.4, filed on Jul. 19, 2016, the entire contents of which are incorporated herein by reference.

TECHNICAL FIELD

The present invention relates to filtering techniques, and particularly to a cubature Kalman filtering method suitable for high-dimensional GNSS/INS deep coupling.

BACKGROUND

Nonlinear filtering is a common information fusion technique in the fields of integrated navigation and target tracking. Different from the significant nonlinearity in the target tracking model, the nonlinear error in the integrated navigation is generally weak. However, due to factors such as filter structure, sensor sampling rate, measurement quality and filter update rate, etc., the nonlinearity in the integrated navigation shows stronger time-varying characteristics. Especially when the system has a large initial error and large measurement noise, and the system carrier operates with high maneuver, the nonlinear state estimation based on Kalman filter (KF) is often difficult to work stably. Extended Kalman filter (EKF) is widely used in engineering. It solves the nonlinear problem of the system based on the Jacobian matrix. The state estimation accuracy can reach the first-order level of Taylor series expansion, and good results are obtained when the carrier is stationary or low dynamic, but the estimation accuracy of strong nonlinear system is poor. The sampling point approximation filtering method represented by unscented Kalman filter (UKF) is rapidly applied as soon as it is proposed. It replaces the Jacobian matrix of a single-point in EKF with the expected value of the Jacobian matrix after multipoint sampling, and has a better smoothing effect on the uncertainty caused by nonlinearity. Cubature Kalman filter (CKF) has better accuracy and stability than UKF in the state estimation of high-dimensional systems. Although its mean accuracy can reach the third-order of Taylor series in the nonlinear Gaussian noise model, the estimation accuracy of its variance is only at the first-order of the Taylor series. The UKF adopts the improved UT sampling method to deal with the non-local sampling problem of sampling points in high-dimensional filtering, which improves the accuracy of variance estimation. Because CKF adopts a symmetric sampling strategy, it cannot use the center point weight to capture the high-order information of the variance.

The accuracy problem and consistency problem of state error variance estimation are more prominent in high-dimensional integrated navigation systems. For example, in engineering, the GNSS/INS loose integration generally adopts 15 dimensions, and the tight integration generally adopts 17 or higher dimensions. However, in deep coupling, due to the need to ensure the auxiliary effect of the INS output on the GNSS tracking loop, more inertial device state errors are required. Meanwhile, in order to eliminate the correlation error between the auxiliary information and the measured value, the state error variable of the code tracking loop and carrier tracking loop are required to be increased into the state variable of the integrated filter. Taking the conventional four visible satellites as an example, the state variable of the increased tracking loop is 12 dimensions, so the existing nonlinear filtering method is difficult to apply to the state estimation problem of high-dimensional GNSS/INS deep coupling.

SUMMARY

Objective of the present invention: the present invention provides a cubature Kalman filtering method suitable for high-dimensional GNSS/INS deep coupling in view of the problems existing in the prior art.

Technical solution: the cubature Kalman filtering method suitable for high-dimensional GNSS/INS deep coupling as described in the present invention includes:

S1, constructing a high-dimensional GNSS/INS deep coupling filter model;

S2, generating an initialization cubature point for the constructed filter model by using standard cubature rules;

S3, performing CKF filtering by using novel cubature point update rules.

Further, the step S1 includes:

S11, setting the INS state variable of the subsystem of the INS as $x_I$ and the GNSS state variable of the subsystem of the GNSS as $x_G$, respectively, wherein, $x_I = [\delta P \; \delta V \; \psi \; k_a \; b_a \; k_\omega \; b_{107}]$, $x_G = [b_c \; d_c \; \delta p_{dll} \; \delta \phi_{pll} \; \delta f_{pll}]$, and wherein in the formula, $[\delta P \; \delta V \; \psi \; k_a \; b_a \; k_\omega \; b_{107}]$ are respectively and successively a 3D position error, a velocity error, an attitude error, an accelerometer coefficient error, an accelerometer coefficient null bias, a gyroscope coefficient error and a constant value drift; $[b_c \; d_c \; \delta p_{dll} \; \delta \phi_{pll} \; \delta f_{pll}]$ are respectively and successively a receiver clock bias, a clock drift, a phase-discrimination pseudo-range error of the code tracking loop, a phase error of the carrier tracking loop, and a frequency error of the carrier tracking loop;

S12, establishing a system model of GNSS/INS deep coupling according to the state variables $x_I$ and $x_G$ as:

$$\begin{bmatrix} \dot{x}_I \\ \dot{x}_G \end{bmatrix} = \begin{bmatrix} F_I(t) & O_{21\times 2} & O_{21\times 4} & O_{21\times 8} \\ O_{2\times 21} & F_G(t) & O_{2\times 4} & O_{2\times 8} \\ F_{ID}(t) & O_{4\times 2} & F_D(t) & O_{4\times 8} \\ F_{IP}(t) & O_{8\times 2} & O_{8\times 4} & F_P(t) \end{bmatrix} \begin{bmatrix} x_I \\ x_G \end{bmatrix} + G \begin{bmatrix} W_I \\ W_G \end{bmatrix},$$

wherein in the formula, $$F_I(t) = \begin{bmatrix} F_N(t) & F_S(t) \\ O_{9\times 9} & F_M(t) \end{bmatrix}_{21\times 21},$$

$F_N(t)$ is a 9-dimensional inertial navigation basic system matrix and $O_{3\times 9}$, $$F_S(t) = \begin{bmatrix} C_a & O_{3\times 3} & O_{3\times 3} & O_{3\times 3} \\ O_{3\times 3} & C_b^n(t) & O_{3\times 3} & O_{3\times 3} \\ O_{3\times 3} & O_{3\times 3} & C_\omega & O_{3\times 3} \\ O_{3\times 3} & O_{3\times 3} & O_{3\times 3} & C_b^n(t) \end{bmatrix}_{12\times 12},$$

$F_M(t)=[O_{12\times 12}]$, $O_{i\times j}$ is a null matrix with i rows and j columns, $C_a$ and $C_\omega$ are an accelerometer coefficient error matrix and a gyroscope coefficient error matrix, respectively, $C_b^n(t)$ is an attitude matrix at t moment, $$F_G(t) = \begin{bmatrix} 0 & 1 \\ 0 & -\frac{1}{T_r} \end{bmatrix}, F_P(t) = \begin{bmatrix} O_{4\times 4} & 2\pi \cdot I_{4\times 4} \\ K_{pll}/T_1 \cdot I_{4\times 4} & 2\pi K_{pll}T_2/T_1 \cdot I_{4\times 4} \end{bmatrix}_{8\times 8},$$

$T_1$ and $T_2$ are parameters of the loop filter, $$F_{ID}(t) = \begin{bmatrix} -\vec{L}_1^T \cdot C_n^e \cdot W & \vec{L}_1^T \cdot C_n^e & O_{1\times 15} \\ -\vec{L}_2^T \cdot C_n^e \cdot W & \vec{L}_2^T \cdot C_n^e & O_{1\times 15} \\ -\vec{L}_3^T \cdot C_n^e \cdot W & \vec{L}_3^T \cdot C_n^e & O_{1\times 15} \\ -\vec{L}_4^T \cdot C_n^e \cdot W & \vec{L}_4^T \cdot C_n^e & O_{1\times 15} \end{bmatrix}_{4\times 21},$$

$$F_D(t) = -\begin{bmatrix} K_{dll} & 0 & 0 & 0 \\ 0 & K_{dll} & 0 & 0 \\ 0 & 0 & K_{dll} & 0 \\ 0 & 0 & 0 & K_{dll} \end{bmatrix}_{4\times 4},$$

$$F_{IP}(t) = \begin{bmatrix} O_{4\times 4} & 2\pi \cdot I_{4\times 4} & O_{4\times 13} \\ K_{pll}/T_1 \cdot I_{4\times 4} & 2\pi K_{pll}T_2/T_1 \cdot I_{4\times 4} & O_{4\times 13} \end{bmatrix}_{8\times 21},$$

$\dot{x}_I$ and $\dot{x}_G$ are differential terms of $x_I$ and $x_G$, respectively, G is a system-noise-driven matrix, $W_I$ and $W_G$ are system noise of INS, GNSS and tracking loops, $T_r$ is a relevant time, $K_{pll}$ is a carrier loop gain, $I_{i\times j}$ is a unit matrix with i rows and j columns, $\vec{L}^T = [\vec{L}_1^T \ \vec{L}_2^T \ \vec{L}_3^T \ \vec{L}_4^T]$ is a radial position vector matrix of satellite and receiver, W is a radial velocity error of satellite and receiver caused by INS position calculation errors, $C_n^e$ is a conversion matrix of navigation coordinate system to earth-centered, earth-fixed coordinate system, $K_{dll}$ is a code loop gain;

S13, establishing a measurement model of GNSS/INS deep coupling according to the system model of GNSS/INS deep coupling as:

$\theta p = p_I - p_G = \theta p_I - (b_c + v_p + \theta p_{dll})$, $\theta \dot{p} = \dot{p}_I - \dot{p}_G = \theta \dot{p}_I - (d_c + v_{\dot{p}} + \theta \dot{p}_{pll})$, wherein in the formula, $\theta p$ and $\theta \dot{p}$ are observed quantities of the pseudo-range and pseudo-range rate of the satellite channel respectively, $p_I$ and $\dot{p}_I$ are the pseudo-range and the pseudo-range rate predicted by INS respectively, $p_G$ and $\dot{p}_G$ are the pseudo-range and the pseudo-range rate measured by GNSS respectively, $b_c$ and $d_c$ the clock bias and clock drift of the receiver respectively, $v_p$ and $v_{\dot{p}}$ are observation noise of the pseudo-range and pseudo-range rate respectively, $\theta p_{dll}$ and $\theta \dot{p}_{pll}$ are the pseudo-range errors and pseudo-range rate errors of the tracking loop respectively, v is a measurement noise matrix, that is $$\begin{bmatrix} \delta \rho \\ \delta \dot{\rho} \end{bmatrix} = H(t) \begin{bmatrix} x_I \\ x_G \end{bmatrix} + v,$$

$$H(t) = \begin{bmatrix} \vec{L}^T C_n^e & O_{4\times 18} & -I_{4\times 1} & O_{4\times 1} & -I_{4\times 4} & O_{4\times 4} & O_{4\times 4} \\ O_{4\times 3} & O_{4\times 18} & O_{4\times 1} & -I_{4\times 1} & O_{4\times 4} & O_{4\times 4} & c/f_{L1} \cdot I_{4\times 4} \end{bmatrix}_{8\times 35},$$

$f_{L1}$ is a GPS L1 carrier frequency, and c is speed of light.

Further, the step S2 includes:

S21, calculating a state posterior distribution at $\hat{x}_{k-1}$ at k−1 moment by using a high-precision nonlinear filtering method;

wherein, $\hat{x}_{k-1} \sim N(\hat{x}_{k-1|k-1}, P_{k-1|k-1})$, $\hat{x}_{k-1}$ represents the state posterior distribution at k−1 moment, $\hat{x}_{k-1|k-1}$ represents the state distribution at k−1 moment speculated from the measurement at k−1 moment, $P_{k-1|k-1}$ represents a covariance of the $\hat{x}_{k-1|k-1}$, $x \sim N(\mu, \sigma^2)$ represents that x obeys a Gaussian distribution with a mean of $\mu$ and a variance of $\sigma^2$;

S22, generating cubature points required during the prediction process of the system state equation f(x) by using the standard cubature rules;

wherein, $$\begin{cases} X_{i,k-1|k-1}^+ = S_{k-1|k-1}\xi_i + \hat{x}_{k-1|k-1} \\ \xi_i = \sqrt{n_x}[I_{n_x} - I_{n_x}]_i \end{cases},$$

wherein n the formula, x is a state variable of the GNS SANS deep coupling filtering model, and its dimension is $n_x$, $I_{n_x}$ is a $n_x$ dimensional unit square matrix, $X_{i,k-1|k-1}$ represents the $i^{th}$ cubature point at k−1 moment speculated from the measurement at k−1 moment, $\xi_i$ is the $i^{th}$ standard cubature point in CKF filtering, i=1, . . . , $2n_x$, $S_{k-1|k-1}$ satisfies the $P_{k-1|k-1} = S_{k-1|k-1}(S_{k-1|k-1})^T$.

Wherein, the high-precision nonlinear filtering method includes: setting the measurement equation of an iterated nonlinear filtering as:

$x_{k|k}^{j+1} = x_{k|k}^j + \alpha_j \{K_j(z_k - h(x_{k|k}^j) - (p_{k|k-1}^{-1} p_{xz,k|k-1})^T \vartheta_j) + \vartheta_j\}$, wherein $x_{k|k}^j$ is a state estimate value of the $j^{th}$ measurement iteration at k moment, $z_k$ is a measured value output by a phase discriminator of the multi-satellite channel at k moment, $h(\cdot)$ is a measurement equation of the deep coupling tracking loop, $\vartheta_j = x_{k|k}^j - \hat{x}_{k|k-1}$ is an error between a posterior estimate and a priori estimate in the current iteration, $K_j$ is a Kalman gain of the $j^{th}$ iteration, $\alpha_j$ is an iterated step-size control coefficient set by accelerating convergence, satisfying $0 < \alpha_j \leq p_{k|k-1}^{-1}$ is an inverse of $P_{k|k-1}$, $P_{xz,k|k-1}$ is an cross-covariance generated during a prediction process, a covariance matrix of state posterior estimation errors takes a result of the last iteration calculation.

Further, step S3 includes:

S31, calculating the state priori distribution at k moment by using the following formula:

$$\begin{cases} x_k^- \sim N(\hat{x}_{k|k-1}, P_{k|k-1}) \\ \hat{x}_{k|k-1} = \sum_{i=1}^{2n_x} w_i f(X_{i,k-1|k-1}^+) \\ P_{k|k-1} = \sum_{i=1}^{2n_x} w_i (f(X_{i,k-1|k-1}^+) - \hat{x}_{k|k-1})(f(X_{i,k-1|k-1}^+) - \hat{x}_{k|k-1})^T + Q_{k-1} \end{cases},$$

wherein in the formula, $x_k^-$ represents a state priori estimate at k moment, $\hat{x}_{k|k-1}$ is its mean, $P_{k|k-1}$ is its variance, $\hat{x}_{k|k-1}$ represents the state estimate at k moment speculated from the measurement and state at k−1 moment, $P_{k|k-1}$ represents the covariance of $\hat{x}_{k|k-1}$, $w_i = 1/2n_x$, and $Q_{k-1}$ is the system noise variance matrix;

S32, calculating the cubature point error matrix $\tilde{X}_{i,k|k-1}^-$ of the prediction process using the following formula, and defining $\Xi_k = P_{k|k-1} - Q'_{k-1}$ as an error variance of the Sigma point statistical linear regression (SLR) in a priori PDF approximation process;

$$\tilde{X}_{i,k|k-1}^- = X_{i,k|k-1} - \hat{x}_{k|k-1}, \ 0 \leq i \leq 2n_x,$$

wherein $X_{i,k|k-1} = f(X_{i,k-1|k-1}^+)$ is the cubature point after $X_{i,k-1|k-1}^+$ propagates through the system equation;

S33, taking the cubature point after the propagation of the system equation as a cubature point of the measurement update process;

S34, using CKF measurement update to calculate a likelihood distribution function of the measured value;

wherein, $$\begin{cases} z_k^- \sim N(\hat{z}_{k|k-1}, P_{zz,k|k-1}) \\ \hat{z}_{k|k-1} = \sum_{i=1}^{2n_x} w_i h(X_{i,k|k-1}) \\ P_{zz,k|k-1} = \sum_{i=1}^{2n_x} w_i (h(X_{i,k|k-1}) - \hat{z}_{k|k-1})(h(X_{i,k|k-1}) - \hat{z}_{k|k-1})^T + R_k \end{cases},$$

wherein in the formula, $z_k^-$ represents a measurement likelihood estimate at k moment, $\hat{z}_{kk-1}$ is its mean, $P_{zz,k|k-1}$ is its variance, $\hat{z}_{k|k-1}$ is a measurement at k moment predicted from the state at k−1 moment, h(x) is the measurement equation, $w_i = 1/2n_x$, and $R_k$ is the measurement noise variance matrix;

S35, calculating a posterior distribution function of a state quantity x;

wherein, $$\begin{cases} x_k^+ \sim N(\hat{x}_{k|k}, P_{k|k}) \\ \hat{x}_{k|k} = \hat{x}_{k|k-1} + K_k(z_k - \hat{z}_{k|k-1}) \\ P_{k|k} = P_{k|k-1} - K_k P_{zz,k|k-1} K_k^T \\ P_{xz,k|k-1} = \sum_{i=1}^{2n_x} w_i (f(x_{i,k-1|k-1}) - \hat{x}_{k|k-1})(h(x_{i,k|k-1}) - \hat{z}_{k|k-1})^T \end{cases},$$

wherein in the formula, $x_k^1$ is a posterior estimate of the state variable at k moment, its mean and variance are $\hat{x}_{k|k}$ and $P_{k|k}$, respectively, $K_k = P_{xz,k|k-1}(P_{zz,k|k-1})_{-1}$ is a Kalman gain matrix, $P_{xz,k|k-1}$ is a cross-covariance between a posterior estimate of the state variable and the measurement likelihood estimate;

S36, defining an error caused by the Sigma point approximation to the posterior distribution as $\Xi_k^+ = P_{k|k}, w = [w_1\ w_2]$ is a weight of a CKF cubature point SLR, the SLR of the priori distribution at k moment should accurately capture the mean and covariance of the state, and consider the effects of system uncertainty and noise, then $$\tilde{X}_{i,k|k-1}^- W = 0,$$

$$\tilde{X}_{i,k|k-1}^{-diag(w)} X_{i,k|k-1}^{-T} = P_{k|k-1} - Q_k,$$

wherein in the formula, $\tilde{X}_{i,k|k-1}$ is a cubature point error matrix of the prediction process, $\Sigma = diag(W)$ represents that the matrix $\Sigma$ is constructed using W diagonal elements, in an SLR of a similar posterior distribution, the cubature point can at least accurately match the mean and variance of the state, namely, $$\tilde{X}_{i,k|k}^+ w = 0,$$

$$\tilde{X}_{i,k|k}^+ diag(W)(\tilde{X}_{i,k|k}^+)^{Ti} = P_{k|k},$$

wherein in the formula, $\tilde{X}_{i,k|k}^+$ is an updated cubature point;

S37, assuming both $\Xi_k^-$ and $\Xi_k^-$ are symmetric positive definite matrices, and $\tilde{X}_{i,k|k}^+ = B \cdot \tilde{X}_{i,k|k-1}^-$, then $\Xi_k^- = L_k(L_k)^T$, $\Xi_k^+ = L_{k+1}(L_{k+1})^T$, wherein B is a transformation matrix to be solved, $\tilde{X}_{i,k|k}^+$ is an updated cubature point error matrix; further $\Xi_k^+ = BL_k(L_k)^t B^T$, $B = L_{k+1} \Gamma (L_k)^{-1}$, wherein $\Gamma$ is an arbitrary orthogonal matrix that satisfies $\Gamma\Gamma^T = I_{n_x}$, when $\Gamma$ is taken as unit matrix, $B = L_{k+1}(L_k)^{-1}$ is obtained;

S38, obtaining an updated cubature point based on the posterior state estimate mean $\hat{x}_{k|k}$ and updated cubature point error matrix as $X_{i,k|k}^+ = \hat{x}_{k|k} + \tilde{X}_{i,k|k}^+$, $0 \leq i \leq 2n_x$.

Further, an equation of the GNSS code tracking phase-discrimination pseudo-range error $\rho_{dll}$ is $$\delta\dot{\rho}_{dll} = -K_{dll}\delta\rho_{dll} + \delta V_{aid} + K_{dll}Q,$$

wherein $\theta\rho_{dll}$ is an output of the code loop filter $\dot{\rho}_{dll}$ is a differential of the $p_{dll}$, $K_{dll}$ is a code loop gain, $\theta V_{aid}$ is a speed assistance provided by the INS to the code tracking loop after filtering output calibration, Q is the system noise caused by loop thermal noise and interference.

Further, equations of the carrier loop errors are $$\delta\dot{\phi}_{pll} = 2\pi(\delta f_{pll} + \delta f_{aid}),$$

$$\delta\dot{f}_{pll} = \left[2\pi\frac{T_2}{T_1}(\delta f_{pll} + \delta f_{aid}) + \frac{\delta\phi_{pll}}{T_1}\right] \cdot K_{pll},$$

wherein, $\phi_{dll}$ is the phase error of the carrier loop, $f_{pll}$ is the frequency error of the carrier loop, $K_{pll}$ is a loop gain, and $\theta f_{aid}$ is a Doppler frequency error assistance provided by the INS to the carrier tracking loop after filtering output calibration, $T_1$ and $T_2$ are parameters of the loop filter, that is, the transfer function of the loop low-pass filter is $$F(s) = \frac{T_2 s + 1}{T_1 s}.$$

Advantageous effects: compared with the prior art, the present invention has the following significant advantages:

(1) initializing and generating the cubature point by using a higher precision nonlinear filtering method;

(2) updating the cubature point based on matrix transformation, which improves the consistency of the prediction process variance in the state estimation process, and improves the stability of the filter;

(3) using the state error parameter of the tracking loop as the state parameter of the integrated filter to eliminate the correlation between the filter measurement and the tracking loop errors, which improves the accuracy and stability of the INS auxiliary quantity calibration;

(4) using two kinds of strategies to generate the cubature point of CKF, that is, the cubature point is generated by using a time-consuming and high-precision method during initialization, and the subsequent cubature point update process is realized based on the variance of the state estimation error at the previous moment, which improves the utilization of the cubature point.

DETAILED DESCRIPTION OF THE EMBODIMENTS

Figure 1:
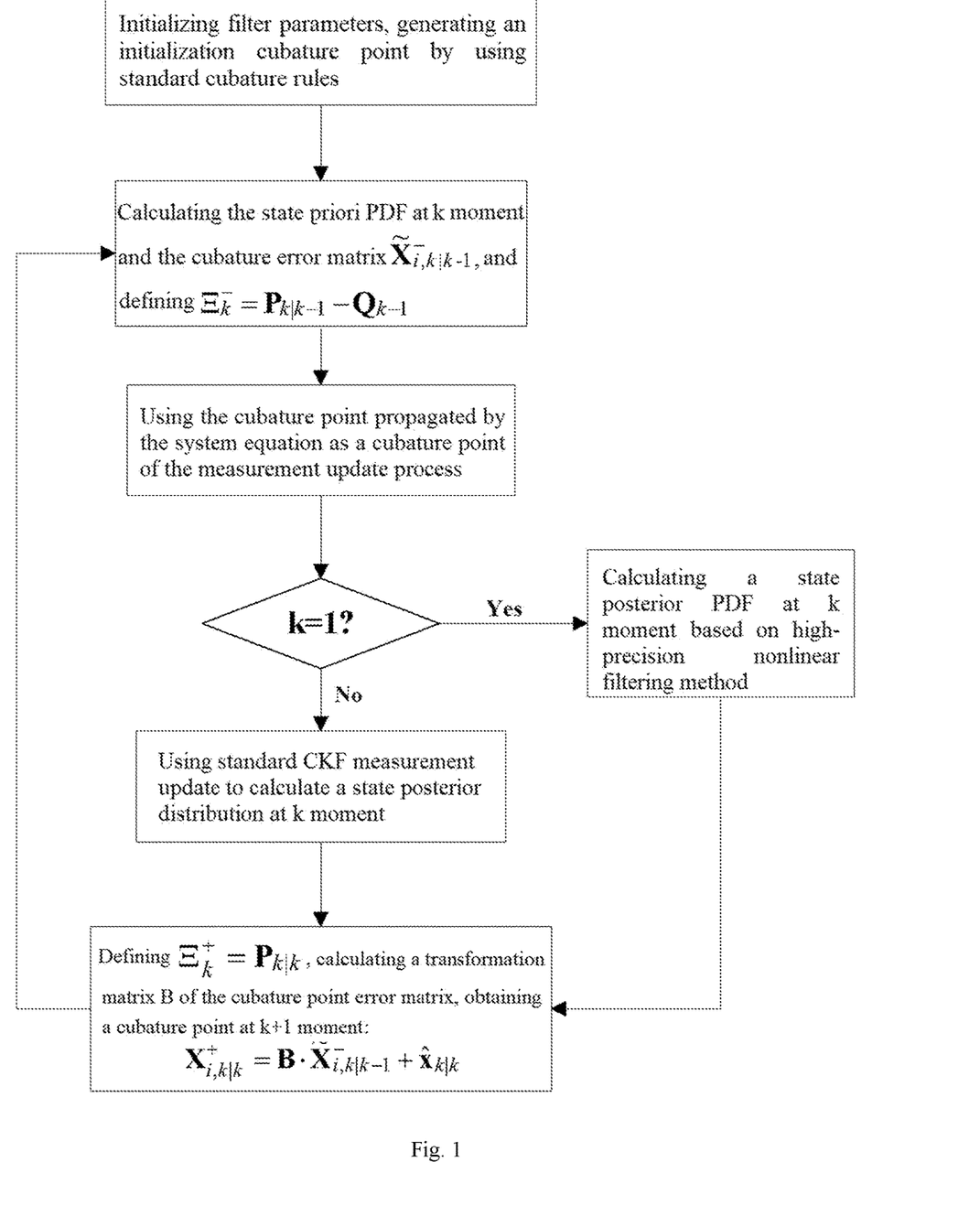
FIG. 1 is a system block diagram according to one embodiment of the present invention.
Figure 2:
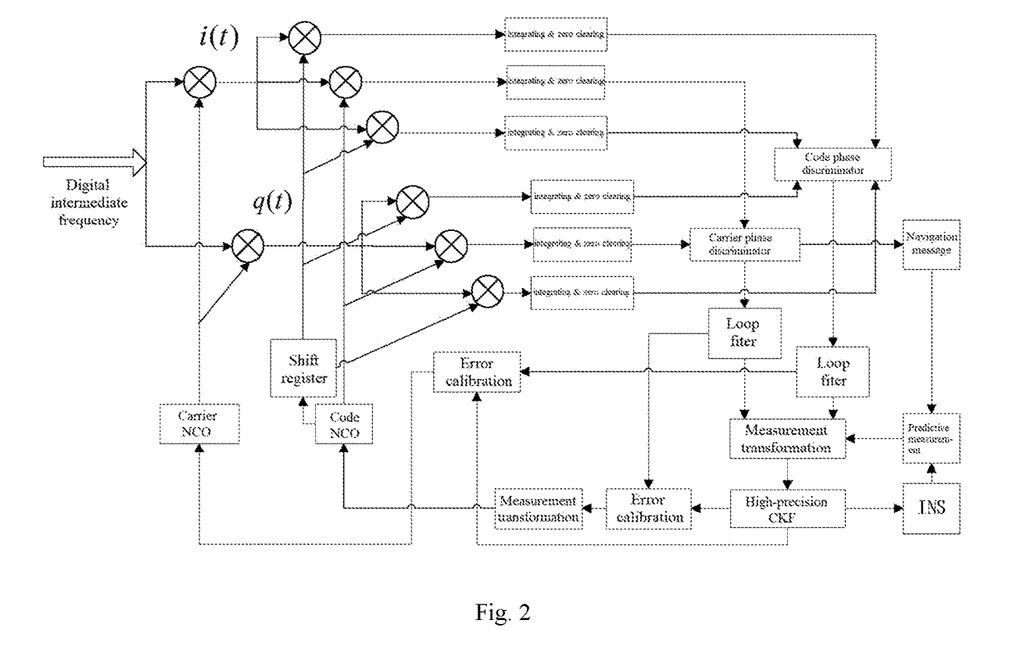
FIG. 2 is a schematic diagram of high-dimensional GNSS/INS deep coupling filtering model.

As shown in FIG. 1, the cubature Kalman filtering method suitable for high-dimensional GNSS/INS deep coupling of the present embodiment includes the following steps:

S1, constructing a high-dimensional GNSS/INS deep coupling filter model, as shown in FIG. 2.

Step S1 specifically includes:

S11, setting the INS state variable of the subsystem of the INS as $x_I$ and the GNSS state variable of the subsystem of the GNSS as $x_G$, respectively, wherein, $$x_I = [\theta P\ \theta V\ \psi\ k_\alpha b_\alpha\ k_\omega\ b_\omega],$$

$$x_G = [b_c\ d_c\ \delta\rho_{dll}\ \delta\phi_{pll}\ \delta f_{pll}],$$

and wherein in the formula, $[\delta P\ \delta V\ \psi\ k_a\ b_a\ k_\omega\ b_{107}]$ are respectively and successively a 3D position error, a velocity error, an attitude error, an accelerometer coefficient error, an accelerometer coefficient null bias, a gyroscope coefficient error and a constant value drift; $[b_c\ d_c\ \delta\rho_{dll}\ \delta\phi_{pll}\ \delta f_{pll}]$ are respectively and successively a receiver clock bias, a clock drift, a phase-discrimination pseudo-range error of the code tracking loop, a phase error of the carrier tracking loop, and a frequency error of the carrier tracking loop.

Wherein an equation of the GNSS code tracking phase-discrimination pseudo-range error $\rho_{dll}$ is $$\delta\dot\rho_{dll} = -K_{dll}\delta\rho_{dll} + \delta V_{aid} + K_{dll}Q,$$

wherein $\delta\rho_{dll}$ is an output of the code loop filter, $\dot\rho_{dll}$ is a differential of the $\rho_{dll}$ $K_{dll}$ is a code loop gain, $\delta V_{aid}$ is a speed assistance provided by the INS to the code tracking loop after filtering output calibration, $Q$ is the system noise caused by loop thermal noise and interference.

Wherein equations of the carrier loop errors are $$\delta\dot\phi_{pll} = 2\pi(\delta f_{pll} + \delta f_{aid}),$$

$$\delta\dot f_{pll} = \left[2\pi\frac{T_2}{T_1}(\delta f_{pll} + \delta f_{aid}) + \frac{\delta\phi_{pll}}{T_1}\right]\cdot K_{pll},$$

wherein, $\phi_{pll}$ is the phase error of the carrier loop, $f_{pll}$ is the frequency error of the carrier loop, $K_{dll}$ is a loop gain, and $\delta f_{aid}$ is a Doppler frequency error assistance provided by the INS to the carrier tracking loop after filtering output calibration, $T_1$ and $T2$ are parameters of the loop filter, that is, the transfer function of the loop low-pass filter is $$F(s) = \frac{T_2 s + 1}{T_1 s}.$$

S12, establishing a system model of GNSS/INS deep coupling according to the state variables $x_I$ and $x_G$ as:

$$\begin{bmatrix} \dot x_I \\ \dot x_G \end{bmatrix} = \begin{bmatrix} F_I(t) & O_{21\times 2} & O_{21\times 4} & O_{21\times 8} \\ O_{2\times 21} & F_G(t) & O_{2\times 4} & O_{2\times 8} \\ F_{ID}(t) & O_{4\times 2} & F_D(t) & O_{4\times 8} \\ F_{IP}(t) & O_{8\times 2} & O_{8\times 4} & F_P(t) \end{bmatrix}\begin{bmatrix} x_I \\ x_G \end{bmatrix} + G\begin{bmatrix} W_I \\ W_G \end{bmatrix},$$

wherein in the formula, $$F_I(t) = \begin{bmatrix} F_N(t) & F_S(t) \\ O_{9\times 9} & F_M(t) \end{bmatrix}_{21\times 21},$$

$F_N(t)$ is a 9-dimensional inertial navigation basic System matrix and $O_{3\times 9}$, $$F_S(t) = \begin{bmatrix} C_a & O_{3\times 3} & O_{3\times 3} & O_{3\times 3} \\ O_{3\times 3} & C_b^n(t) & O_{3\times 3} & O_{3\times 3} \\ O_{3\times 3} & O_{3\times 3} & C_\omega & O_{3\times 3} \\ O_{3\times 3} & O_{3\times 3} & O_{3\times 3} & C_b^n(t) \end{bmatrix}_{12\times 12},$$

$F_M(t) = [O_{12\times 12}]$, $O_{i\times j}$ is a null matrix with i rows and j columns, $C_\alpha$ and $C_\omega$ are an accelerometer coefficient error matrix and a gyroscope coefficient error matrix respectively, $C_b^n(t)$ is an attitude matrix at t moment, $$F_G(t) = \begin{bmatrix} 0 & 1 \\ 0 & -\frac{1}{T_r} \end{bmatrix},$$

$$F_P(t) = \begin{bmatrix} O_{4\times 4} & 2\pi\cdot I_{4\times 4} \\ K_{pll}/T_1\cdot I_{4\times 4} & 2\pi K_{pll}T_2/T_1\cdot I_{4\times 4} \end{bmatrix}_{8\times 8},$$

$T_1$ and $T_2$ are parameters of the loop filter, $$F_{ID}(t) = \begin{bmatrix} -\vec L_1^T\cdot C_n^e\cdot W & \vec L_1^T\cdot C_n^e & O_{1\times 15} \\ -\vec L_2^T\cdot C_n^e\cdot W & \vec L_2^T\cdot C_n^e & O_{1\times 15} \\ -\vec L_3^T\cdot C_n^e\cdot W & \vec L_3^T\cdot C_n^e & O_{1\times 15} \\ -\vec L_4^T\cdot C_n^e\cdot W & \vec L_4^T\cdot C_n^e & O_{1\times 15} \end{bmatrix}_{4\times 12},$$

$$F_D(t) = -\begin{bmatrix} K_{dll} & 0 & 0 & 0 \\ 0 & K_{dll} & 0 & 0 \\ 0 & 0 & K_{dll} & 0 \\ 0 & 0 & 0 & K_{dll} \end{bmatrix}_{4\times 4},$$

$$F_{IP}(t) = \begin{bmatrix} O_{4\times 4} & 2\pi\cdot I_{4\times 4} & O_{4\times 13} \\ K_{pll}/T_1\cdot I_{4\times 4} & 2\pi K_{pll}T_2/T_1\cdot I_{4\times 4} & O_{4\times 13} \end{bmatrix}_{8\times 21},$$

$\dot x_I$ and $\dot x_G$ are differential terms of $x_I$ and $x_G$ respectively, $G$ is a system-noise-driven matrix, $W_I$ and $W_G$ are system noise of INS, GNSS and tracking loops, $T_r$ is a relevant time, $K_{pll}$ is a carrier loop gain, $I_{i\times j}$ is a unit matrix with i rows and j columns, $\vec L^T = [\vec L_1^T\ \vec L_2^T\ \vec L_3^T\ \vec L_4^T]$ is a radial position vector matrix of satellite and receiver, $W$ is a radial velocity error of satellite and receiver caused by INS position calculation errors, $C_n^e$ is a conversion matrix of navigation coordinate system to earth-centered, earth-fixed coordinate system, $K_{dll}$ is a code loop gain.

S13, establishing a measurement model of GNSS/INS deep coupling according to the system model of GNSS/INS deep coupling as:

$$\delta\rho = \rho_I - \rho_G = \delta\rho_I - (b_c + v_\rho + \delta\rho_{dll}),$$

$$\delta\dot\rho = \dot\rho_I - \dot\rho_G = \delta\dot\rho_I - (d_c + v_{\dot\rho} + \delta\dot\rho_{pll}),$$

wherein in the formula, $\delta\rho$ and $\delta\dot{\rho}$ are observed quantities of the pseudo-range and pseudo-range rate of the satellite channel respectively, $\rho_I$ and $\dot{\rho}_I$ are the pseudo-range and the pseudo-range rate predicted by INS respectively, $\rho_G$ and $\dot{\rho}_G$ are the pseudo-range and the pseudo-range rate measured by GNSS respectively, $b_c$ and $d_c$ are the clock bias and clock drift of the receiver respectively, $v_\rho$ and $v_{\dot{\rho}}$ are observation noise of the pseudo-range and pseudo-range rate respectively, $\delta\rho_{dll}$ and $\delta\dot{\rho}_{pll}$ are the pseudo-range errors and pseudo-range rate errors of the tracking loop respectively, $v$ is a measurement noise matrix, that is $$\begin{bmatrix} \delta\rho \\ \delta\dot{\rho} \end{bmatrix} = H(t)\begin{bmatrix} x_I \\ x_G \end{bmatrix} + v,$$

$$H(t) = \begin{bmatrix} \vec{L}^T C_n^e & 0_{4\times 18} & -I_{4\times 1} & 0_{4\times 1} & -I_{4\times 4} & 0_{4\times 4} & 0_{4\times 4} \\ 0_{4\times 3} & 0_{4\times 18} & 0_{4\times 1} & -I_{4\times 1} & 0_{4\times 4} & 0_{4\times 4} & c/f_{L1}\cdot I_{4\times 4} \end{bmatrix}_{8\times 35},$$

$f_{L1}$ is a GPS L1 carrier frequency, and c is speed of light.

S2, generating an initialization cubature point for the constructed filter model by using standard cubature rules.

Step S2 specifically includes:

S21, calculating a state posterior distribution $\hat{x}_{k-1}$ at k-1 moment by using a high-precision nonlinear filtering method;

wherein, $\hat{x}_{k-1} \sim N(\hat{x}_{k-1|k-1}, P_{k-1|k-1})$, $\hat{x}_{k-1}$ represents the state posterior distribution at k-1 moment, $\hat{x}_{k-1|k-1}$ represents the state distribution at k-1 moment speculated from the measurement at k-1 moment, $P_{k-1|k-1}$ represents a covariance of the $\hat{x}_{k-1|k-1}$, $x\sim N(\mu, \sigma^2)$ represents that x obeys a Gaussian distribution with a mean of $\mu$ and a variance of $\sigma^2$.

Wherein, the high-precision nonlinear filtering method includes: setting the measurement equation of an iterated nonlinear filtering as:

$$x_{k|k}^{j+1} = x_{k|k}^j + \alpha_j\{K_j(z_k - h(x_{k|k}^j) - (p_{k|k-1}^{-1}p_{xz,k|k-1})^T\vartheta_j) + \vartheta_j\},$$

where $x_{k|k}^j$ is a state estimate value of the $j^{th}$ measurement iteration at k moment, $z_k$ is a measured value output by a phase discriminator of the multi-satellite channel at k moment, $h(\cdot)$ is a measurement equation of the deep coupling tracking loop, $\vartheta_j = x_{k|k}^j - \hat{x}_{k|k-1}$ is an error between a posterior estimate and a priori estimate in the current iteration, $K_j$ is a Kalman gain of the $j^{th}$ iteration, $\alpha_j$ is an iterated step-size control coefficient set by accelerating convergence, satisfying $0<\alpha_j\leq 1$, $P_{k|k-1}^{-1}$ is an inverse of $P_{k|k-1}$, $P_{xz,\ k|k-1}$ is an cross-covariance generated during the prediction process, the covariance matrix of the state posterior estimation errors takes the result of the last iteration calculation.

S22, generating cubature points required during the prediction process of the system state equation f(x) by using the standard cubature rules;

wherein, $$\begin{cases} X_{i,k-1|k-1}^+ = S_{k-1|k-1}\xi_i + \hat{x}_{k-1|k-1} \\ \xi_i = \sqrt{n_x}[I_{n_x}, -I_{n_x}]_i \end{cases},$$

wherein in the formula, x is a state variable of the GNSS/INS deep coupling filtering model, and its dimension is $n_x$, $I_{n_x}$ is a $n_x$ dimensional unit square matrix, $X_{i,k-1|k}^+$ represents the $i^{th}$ cubature point at k-1 moment speculated from the measurement at k-1 moment, $\xi_i$ is the $i^{th}$ standard cubature point in CKF filtering, $i=1, \ldots, 2n_x$, $S_{k-1|k-1}$ satisfies the $P_{k-1|k-1} = S_{k-1|k-1}(S_{k-1|k-1})^T$.

S3, performing CKF filtering by using novel cubature point update rules.

Step S3 includes:

S31, calculating the state priori distribution at k moment by using the following formula:

$$\begin{cases} x_k^- \sim N(\hat{x}_{k|k-1}, P_{k|k-1}) \\ \hat{x}_{k|k-1} = \sum_{i=1}^{2n_x} w_i f(X_{i,k-1|k-1}^+) \\ P_{k|k-1} = \sum_{i=1}^{2n_x} w_i(f(X_{i,k-1|k-1}^+) - \hat{x}_{k|k-1})(f(X_{i,k-1|k-1}^+) - \hat{x}_{k|k-1})^T + Q_{k-1} \end{cases},$$

wherein in the formula, $x_k^-$ represents a state priori estimate at k moment, $\hat{x}_{k|k-1}$ is its mean, $P_{k|k-1}$ is its variance, $\hat{x}_{k|k-1}$ represents the state estimate at k moment speculated from the measurement and state at k-1 moment, $P_{k|k-1}$ represents the covariance of $\hat{x}_{k|k-1}$, $w_i = 1/2n_x$, and $Q_{k-1}$ is the system noise variance matrix;

S32, calculating the cubature point error matrix $\tilde{X}_{i,k|k-1}^-$ of the prediction process using the following formula, and defining $\Xi_k^- = P_{k-1}^- - Q_{k-1}$ as an error variance of the Sigma point statistical linear regression (SLR) in a priori PDF approximation process;

$$\tilde{X}_{i,k|k-1}^- = X_{i,k|k-1} - \tilde{x}_{k|k-1}, 0\leq i\leq 2n_x,$$

wherein $X_{i,k|k-1} = f(X_{i,k\ 1k\ 1}^+)$ is the cubature point after $X_{i,k-1|k-1}^+$ propagates through the system equation;

S33, taking the cubature point after the propagation of the system equation as a cubature point of the measurement update process;

S34, using CKF measurement update to calculate a likelihood distribution function of the measured value;

wherein, $$\begin{cases} z_k^- \sim N(\hat{z}_{k|k-1}, P_{zz,k|k-1}) \\ \hat{z}_{k|k-1} = \sum_{i=1}^{2n_x} w_i h(X_{i,k|k-1}) \\ P_{zz,k|k-1} = \sum_{i=1}^{2n_x} w_i(h(X_{i,k|k-1}) - \hat{z}_{k|k-1})(h(X_{i,k|k-1}) - \hat{z}_{k|k-1})^T + R_k \end{cases},$$

wherein in the formula, $z_k^-$ represents a measurement likelihood estimate at k moment, $\hat{z}_{k|k-1}$ is its mean, $P_{zz,k|k-1}$ is its variance, $\tilde{z}_{k|k-1}$ is a measurement at k moment predicted from the state at k-1 moment, h(x) is the measurement equation, $w_i = 1/2n_x$, and $R_k$ is the measurement noise variance matrix;

S35, calculating a posterior distribution function of a state quantity x;

wherein, $$\begin{cases} x_k^+ \sim N(\hat{x}_{k|k}, P_{k|k}) \\ \hat{x}_{k|k} = \hat{x}_{k|k-1} + K_k(z_k - \hat{z}_{k|k-1}) \\ P_{k|k} = P_{k|k-1} - K_k P_{zz,k|k-1} K_k^T \\ P_{xz,k|k-1} = \sum_{i=1}^{2n_x} w_i(f(X_{i,k-1|k-1}(-\hat{x}_{k|k-1})(h(X_{i,k|k-1}) - \hat{z}_{k|k-1})^T \end{cases}$$

wherein in the formula, $x_k^+$ is a posterior estimate of the state variable at k moment, its mean and variance are $\hat{x}_{k|k}$, and $P_{k|k}$, respectively, $K_k = P_{xz,k|k-1}(P_{zz,k|k-1})^{-1}$ is a Kalman gain matrix, $P_{xz,k|k-1}$ is a cross-covariance between a posterior estimate of the state variable and the measured likelihood estimate;

S36, defining an error caused by the Sigma point approximation to the posterior distribution as $\Xi_k^+ = P_{k|k}$, $w = [w_1 \ldots w_{2n_x}]$ is a weight of a CKF cubature point SLR, the SLR of the priori distribution at k moment should accurately capture the mean and covariance of the state, and consider the effects of system uncertainty and noise, then $$\tilde{X}_{i,k|k-1}^- W = 0,$$

$$\tilde{X}_{i,k|k-1}^{-diag(w)} X_{i,k|k-1}^{-T} = P_{k|k-1} - Q_k,$$

wherein in the formula, $\tilde{X}_{i,k|k-1}$ is a cubature point error matrix of the prediction process, $\Sigma = \text{diag}(W)$ represents that the matrix $\Sigma$ is constructed using W diagonal elements, in an SLR of a similar posterior distribution, the cubature point can at least accurately match the mean and variance of the state, namely, $$\tilde{X}_{i,k|k}^+ w = 0,$$

$$\tilde{X}_{i,k|k}^+ \text{diag}(W)(\tilde{X}i,k|k^+)^{Ti} = P_{k|k},$$

wherein in the formula, $\tilde{X}_{i,k|k}^+$ is an updated cubature point;

S37, assuming both $\Xi_k^+$ and $\Xi_k^-$ are symmetric positive definite matrices, and $\tilde{X}_{i,k|k} = B \cdot \tilde{X}_{i,k|k-1}^-$, then $\Xi_k^- = L_k(L_k)^T$, $\mu_k^+ = L_{k+1}(L_{k+1})^T$, wherein B is a transformation matrix to be solved, $\tilde{X}_{i,k|k}^+$ is an updated cubature point error matrix; further $\Xi_k^+ = B L_k(L_k)^T B^T$, $B = L_{k+1} \Gamma(L_k)^{-1}$, wherein $\Gamma$ is an arbitrary orthogonal matrix that satisfies $\Gamma \Gamma^T = I_{n_x}$, when $\Gamma$ is taken as unit matrix, $B = L_{k+1}(L_k)^{-1}$ is obtained;

S38, obtaining an updated cubature point based on the posterior state estimate mean $\hat{x}_{k|k}$ and updated cubature point error matrix as $X_{i,k|k}^+ = \hat{x}_{k|k} + \tilde{X}_{i,k|k}^+$ 0 $\leq i \leq 2n_x$.

The above are only preferred embodiments of the present invention, and the scope of the present invention is not limited thereto. Therefore, equivalent changes made according to the claims of the present invention are still within the scope of the present invention.

What is claimed is:

1. A method of integrated navigation and target tracking for high-dimensional GNSS/INS deep coupling comprising a cubature Kalman filtering (CKF) method, wherein the cubature Kalman filtering method comprises:

S1, constructing a high-dimensional GNSS/INS deep coupling filter model to obtain a constructed filter model;

S2, generating an initialization cubature point for the constructed filter model by using standard cubature rules;

S3, performing CKF filtering on the constructed filter model by using novel cubature point update rules;

wherein the step S3 comprises:

S31, calculating a state priori distribution at k moment by using the following formula:

$$\begin{cases} x_k^- \sim N(\hat{x}_{k|k-1}, P_{k|k-1}) \\ \hat{x}_{k|k-1} = \sum_{i=1}^{2n_x} w_i f(X_{i,k-1|k-1}^+) \\ P_{k|k-1} = \sum_{i=1}^{2n_x} w_i (f(X_{i,k-1|k-1}^+) - \hat{x}_{k|k-1})(f(X_{i,k-1|k-1}^+) - \hat{x}_{k|k-1})^T + Q_{k-1} \end{cases},$$

wherein in the formula, $x_k^-$ represents a state priori estimate at k moment, $\hat{x}_{k|k-1}$ is a mean of the $x_k^-$, $P_{k|k-1}$ is a variance of the $x_k^-$, $\hat{x}_{k|k-1}$ represents a state estimate at k moment speculated from a measurement and a state at k-1 moment, $P_{k|k-1}$ represents a covariance of $\hat{x}_{k|k-1}$, $w_i = 1/2n_x$, and $Q_{k-1}$ is a system noise variance matrix;

S32, calculating a cubature point error matrix $\tilde{x}_{i,k|k-1}^-$ of the prediction process using the following formula, and defining $\Xi_k^- = P_{k|k-1} - Q_{k-1}$ as an error variance of a Sigma point statistical linear regression (SLR) in a priori PDF approximation process;

$$\tilde{x}_{i,k|k-1}^- = x_{i,k|k-1} - \hat{x}_{k|k-1}, \quad 0 \leq i \leq 2n_x,$$

wherein $x_{i,k|k-1} = f(x_{i,k-1|k-1}^+)$ is a cubature point after $x_{i,k-1|k-1}^+$ propagates through a system equation;

S33, taking the cubature point after the propagation of the system equation as a cubature point of a measurement update process;

S34, using a CKF measurement update to calculate a likelihood distribution function of a measured value;

wherein, $$\begin{cases} z_k^- \sim N(\hat{z}_{k|k-1}, P_{zz,k|k-1}) \\ \hat{z}_{k|k-1} = \sum_{i=1}^{2n_x} w_i h(X_{i,k|k-1}) \\ P_{zz,k|k-1} = \sum_{i=1}^{2n_x} w_i (h(X_{i,k|k-1}) - \hat{z}_{k|k-1})(h(X_{i,k|k-1}) - \hat{z}_{k|k-1})^T + R_k \end{cases},$$

wherein in the formula, $z_k^-$ represents a measurement likelihood estimate at k moment, $\hat{z}_{k|k-1}$ is a mean of the $z_k^-$, $P_{zz,k|k-1}$ is a variance of the $z_k^-$, $\hat{z}_{k|k-1}$ is a measurement at k moment predicted from the state at k-1 moment, $h(x)$ is a measurement equation, $w_i = 1/2n_x$, and $R_k$ is a measurement noise variance matrix;

S35, calculating a posterior distribution function of a state variable x;

wherein $$\begin{cases} x_k^+ \sim N(\hat{x}_{k|k}, P_{k|k}) \\ \hat{x}_{k|k} = \hat{x}_{k|k-1} + K_k(z_k - \hat{z}_{k|k-1}) \\ P_{k|k} = P_{k|k-1} - K_k P_{zz,k|k-1} K_k^T \\ P_{xz,k|k-1} = \sum_{i=1}^{2n_x} w_i (f(X_{i,k-1|k-1})(-\hat{x}_{k|k-1})(h(X_{i,k|k-1}) - \hat{z}_{k|k-1})^T \end{cases},$$

wherein in the formula, $x_k^+$, is a posterior estimate of the state variable at k moment, a mean and a variance of the $x_k^+$ are $\hat{x}_{k|k}$ and $P_{k|k}$, respectively, $K_k = P_{xz,k|k-1}(P_{zz,k|k-1})^{-1}$ is a Kalman gain matrix, $P_{xz,k|k-1}$ is a cross-covariance between a posterior estimate of the state variable and the measurement likelihood estimate;

S36, defining an error caused by a Sigma point approximation to a posterior distribution as $\Xi_k^+ = P_{k|k}$, $w = [w_1 \ldots w_{2n_x}]$ is a weight of a CKF cubature point SLR, a SLR of the priori distribution at k moment accurately captures a mean and a covariance of the state, and consider effects of system uncertainty and noise, then $$\tilde{x}_{i,k|k-1}^- w = 0,$$

$$\tilde{x}_{i,k|k-1}^- \text{diag}(w) \tilde{x}_{i,k|k-1}^{-T} = P_{k|k-1} - Q_k,$$

wherein in the formula, $\tilde{x}_{i,k|k-1}^{-}$ is the cubature point error matrix of the prediction process, $\Sigma=\text{diag}(w)$ represents that the matrix $\Sigma$ is constructed using w diagonal elements, in a SLR of a similar posterior distribution, the cubature point can at least accurately match the mean and the variance of the state, namely, $$\tilde{x}_{i,k|k}w=0,$$

$$\tilde{x}_{i,k|k}^{+}\text{diag}(w)(\tilde{x}_{i,k|k}^{+})^T=P_{k|k},$$

wherein in the formula, $\tilde{X}_{i,k|k}^{+}$ is an updated cubature point;

S37, assuming both $\Xi_k^{-}$ and $\Xi_k^{+}$ are symmetric positive definite matrices, and $\tilde{x}_{i,k|k}=B \cdot \tilde{X}_{i,k|K-1}^{-}$, then $\Xi_k^{-}=L_k(L_k)^T$, $\Xi_k^{+}=L_{k+1}(L_{k+1})^T$ wherein B is a transformation matrix to be solved, $\tilde{x}_{i,k|k}^{+}$ is an updated cubature point error matrix; further $\Xi_k^{+}=BL_k(L_k)^TB^T$, $B=L_{k+1}\Gamma(L_k)^{-1}$, wherein $\Gamma$ is an arbitrary orthogonal matrix that satisfies $\Gamma\Gamma^T=I_{n_x}$, when $\Gamma$ is taken as a unit matrix, $B=L_{k+1}(L_k)^{-1}$ is obtained;

S38, obtaining an updated cubature point based on a posterior state estimate mean $\hat{x}_{k|k}$ and an updated cubature point error matrix as $x^+_{i,k|k}=\hat{x}_{k|k}=\tilde{x}_{i,k|k}^+$, $0 \leq i \leq 2n_x$.

2. The method according to claim 1, wherein the step S1 comprises:

S11, setting an INS state variable of a subsystem of an INS as $x_I$ and a GNSS state variable of a subsystem of a GNSS as $x_G$, respectively, wherein, $$x_I=[\delta P\ \delta V\ \psi\ k_a\ b_a\ K_{107}\ b_\omega],$$

$$x_G=[b_c\ d_c\ \delta\rho_{dll}\ \delta\phi_{pll}\ \delta f_{pll}],$$

and wherein in the formula, $[\delta P\ \delta V\ \psi k_\alpha b_\alpha k_\omega b_\omega]$ are respectively and successively a 3D position error, a velocity error, an attitude error, an accelerometer coefficient error, an accelerometer coefficient null bias, a gyroscope coefficient error and a constant value drift; $[b_c\ d_c\ \delta\rho_{dll}\ \delta\phi_{pll}\ \delta f_{pll}]$ are respectively and successively a receiver clock bias, a clock drift, a phase-discrimination pseudo-range error of a code tracking loop, a phase error of a carrier tracking loop, and a frequency error of a carrier tracking loop;

S12, establishing a system model of the high-dimensional GNSS/INS deep coupling according to the INS state variable $x_I$ and the GNSS state variable $x_G$ as:

$$\begin{bmatrix} \dot{x}_I \\ \dot{x}_G \end{bmatrix} = \begin{bmatrix} F_I(t) & O_{21\times 2} & O_{21\times 4} & O_{21\times 8} \\ O_{2\times 21} & F_G(t) & O_{2\times 4} & O_{2\times 8} \\ F_{ID}(t) & O_{4\times 2} & F_D(t) & O_{4\times 8} \\ F_{IP}(t) & O_{8\times 2} & O_{8\times 4} & F_P(t) \end{bmatrix} \begin{bmatrix} x_I \\ x_G \end{bmatrix} + G \begin{bmatrix} W_I \\ W_G \end{bmatrix},$$

wherein in the formula, $$F_I(t) = \begin{bmatrix} F_N(t) & F_S(t) \\ O_{9\times 9} & F_M(t) \end{bmatrix}_{21\times 21},$$

$F_N(t)$ is a 9-dimensional inertial navigation basic system matrix and $O_{3\times 9}$, $$F_S(t) = \begin{bmatrix} C_a & O_{3\times 3} & O_{3\times 3} & O_{3\times 3} \\ O_{3\times 3} & C_b^n(t) & O_{3\times 3} & O_{3\times 3} \\ O_{3\times 3} & O_{3\times 3} & C_\omega & O_{3\times 3} \\ O_{3\times 3} & O_{3\times 3} & O_{3\times 3} & C_b^n(t) \end{bmatrix}_{12\times 12},$$

$F_M(t)=[O_{12\times 12}]$, $O_{i\times j}$ is a null matrix with i rows and j columns, $C_a$ and $C_\omega$ are an accelerometer coefficient error matrix and a gyroscope coefficient error matrix respectively, $C_b^n(t)$ is an attitude matrix at t moment, $$F_G(t) = \begin{bmatrix} 0 & 1 \\ 0 & -\frac{1}{T_r} \end{bmatrix}, F_P(t) = \begin{bmatrix} O_{4\times 4} & 2\pi \cdot I_{4\times 4} \\ K_{pll}/T_1 \cdot I_{4\times 4} & 2\pi K_{pll}T_2/T_1 \cdot I_{4\times 4} \end{bmatrix}_{8\times 8},$$

$T_1$ and $T_2$ are parameters of a loop filter, $$F_{ID}(t) = \begin{bmatrix} -\vec{L}_1^T \cdot C_n^e \cdot W & \vec{L}_1^T \cdot C_n^e & O_{1\times 15} \\ -\vec{L}_2^T \cdot C_n^e \cdot W & \vec{L}_2^T \cdot C_n^e & O_{1\times 15} \\ -\vec{L}_3^T \cdot C_n^e \cdot W & \vec{L}_3^T \cdot C_n^e & O_{1\times 15} \\ -\vec{L}_4^T \cdot C_n^e \cdot W & \vec{L}_4^T \cdot C_n^e & O_{1\times 15} \end{bmatrix}_{4\times 21},$$

$$F_D(t) = -\begin{bmatrix} K_{dll} & 0 & 0 & 0 \\ 0 & K_{dll} & 0 & 0 \\ 0 & 0 & K_{dll} & 0 \\ 0 & 0 & 0 & K_{dll} \end{bmatrix}_{4\times 4},$$

$$F_{IP}(t) = \begin{bmatrix} O_{4\times 4} & 2\pi \cdot I_{4\times 4} & O_{4\times 13} \\ K_{pll}/T_1 \cdot I_{4\times 4} & 2\pi K_{pll}T_2/T_1 \cdot I_{4\times 4} & O_{4\times 13} \end{bmatrix}_{8\times 21},$$

$\dot{x}_I$ and $\dot{x}_G$ are differential terms of $x_I$ and $x_G$ respectively, G is a system-noise-driven matrix, $W_I$ and $W_G$ are system noise of the INS, the GNSS and tracking loops, $T_r$ is a relevant time, $K_{pll}$ is a carrier loop gain, $I_{i\times j}$ is a unit matrix with i rows and j columns, $\vec{L}^T=[\vec{L}_1^T\ \vec{L}_2^T\ \vec{L}_3^T\ \vec{L}_4^T]$ is a radial position vector matrix of a satellite and a receiver, W is a radial velocity error of the satellite and the receiver caused by INS position calculation errors, $C_n^e$ is a conversion matrix of navigation coordinate system to earth-centered earth-fixed coordinate system, $K_{dll}$ is a code loop gain;

S13, establishing a measurement model of GNSS/INS deep coupling according to the system model of GNSS/INS deep coupling as:

$$\delta\rho=\rho_I-\rho_G=\delta\rho_I-(b_c+v_\rho+\delta\rho_{dll}),$$

$$\delta\dot{\rho}=\dot{\rho}_I-\dot{\rho}_G=\delta\dot{\rho}_I-(b_c+v_{\dot{\rho}}+\delta\rho_{dll}),$$

wherein in the formula, $\delta\rho$ and $\delta\dot{\rho}$ are observed quantities of a pseudo-range and a pseudo-range rate of a satellite channel respectively, $\rho_I$ and $\dot{\rho}_I$, are a pseudo-range and a pseudo-range rate predicted by the INS respectively, $\rho_G$ and $\dot{\rho}_G$ are a pseudo-range and a pseudo-range rate measured by the GNSS respectively, $b_c$ and $d_c$ are a clock bias and a clock drift of the receiver respectively, $v_\rho$ and $v_{\dot{\rho}}$ are observation noise of the pseudo-range and the pseudo-range rate respectively, $\delta\rho_{dll}$ and $\delta\rho_{pll}$ are pseudo-range errors and pseudo-range rate errors of the tracking loops respectively, v is a measurement noise matrix, that is $$\begin{bmatrix} \delta\rho \\ \delta\dot{\rho} \end{bmatrix} = H(t) \begin{bmatrix} x_I \\ x_G \end{bmatrix} + v,$$

-continued $$H(t) = \begin{bmatrix} \vec{L}^T C_n^e & 0_{4\times 18} & -I_{4\times 1} & 0_{4\times 1} & -I_{4\times 4} & 0_{4\times 4} & 0_{4\times 4} \\ 0_{4\times 3} & 0_{4\times 18} & 0_{4\times 1} & -I_{4\times 1} & 0_{4\times 4} & 0_{4\times 4} & c/f_{L1} \cdot I_{4\times 4} \end{bmatrix}_{8\times 35},$$

$f_{L1}$ is a GPS L1 carrier frequency, and c is speed of light.

3. The method according to claim 2, wherein an equation of the phase-discrimination pseudo-range error $\rho_{dll}$ of the code tracking loop is $$\delta\dot{\rho}_{dll} = -K_{dll}\delta\rho_{dll} + \delta V_{aid} + K_{dll}Q,$$

wherein $\delta\rho_{dll}$ is an output of a code loop filter, $\dot{\rho}_{dll}$ is a differential of the $\rho_{dll}$, $K_{dll}$ is a code loop gain, $\delta V_{aid}$ is a speed assistance provided by the INS to the code tracking loop after a filtering output calibration, Q is system noise caused by loop thermal noise and interferences.

4. The method dimensional GNS SANS deep coupling according to claim 2, wherein equations of errors of the carrier tracking loop are $$\delta\dot{\phi}_{pll} = 2\pi(\delta f_{pll} + \delta f_{aid}),$$

$$\delta\dot{f}_{pll} = \left[2\pi \frac{T_2}{T_1}(\delta f_{pll} + \delta f_{aid}) + \frac{\delta\phi_{pll}}{T_1}\right] \cdot K_{pll},$$

wherein, $\phi_{pll}$ is the phase error of the carrier tracking loop, $f_{pll}$ is the frequency error of the carrier tracking loop, and $\delta f_{aid}$ is a Doppler frequency error assistance provided by the INS to the carrier tracking loop after a filtering output calibration, $T_1$ and $T_2$ are parameters of the loop filter, that is, a transfer function of the loop filter is $$F(s) = \frac{T_2 s + 1}{T_1 s}.$$

5. The method according to claim 1, wherein the step S2 comprises:
S21, calculating a state posterior distribution $\hat{x}_{k-1}$ at k−1 moment by using a high-precision nonlinear filtering method;

wherein, $\hat{x}_{k-1} \sim N(\hat{x}_{k-1|k-1}, P_{k-1|k-1})$, $\hat{x}_{k-1}$ represents the state posterior distribution at k−1 moment, $\hat{x}_{k-1|k-1}$ represents the state distribution at k−1 moment speculated from the measurement at k−1 moment, $P_{k-1|k-1}$ represents a covariance of the $\hat{x}_{k-1|k-1}$, $x \sim N(\mu, \sigma^2)$ represents that x obeys a Gaussian distribution with a mean of $\mu$ and a variance of $\sigma^2$;
S22, generating cubature points required during a prediction process of a system state equation f(x) by using the standard cubature rules;
wherein.

$$\begin{cases} X_{i,k-1|k-1}^+ = S_{k-1|k-1}\xi_i + \hat{x}_{k-1|k-1} \\ \xi_i = \sqrt{n_x}\,[I_{n_x} \; -I_{n_x}]_i \end{cases},$$

wherein in the formula, x is a state variable of the GNSS/INS deep coupling filtering model, and a dimension of the x is $n_x$, $I_{n_x}$ is a $n_x$ dimensional unit square matrix, $x_{i,k-1|k-1}$ represents the $i^{th}$ cubature point at k−1 moment speculated from the measurement at k−1 moment, $\zeta_i$ is the $i^{th}$ standard cubature point in the CKF filtering, i=1, ... , $2n_x$, $S_{k-1|k-1}$ satisfies $P_{k-1|k-1} = S_{k-1|k-1}(S_{k-1|k-1})^T$.

6. The method according to claim 5, wherein the high-precision nonlinear filtering method comprises:
setting a measurement equation of an iterated nonlinear filtering as:

$$x_{k|k}^{j+1} = x_{k|k}^j + \alpha_j\{K_j(z_k - h(x_{k|k}^j) - (p_{k|k-1}^{-1} p_{xz,k|k-1})^T \vartheta_j) + \vartheta_j\},$$

wherein $x_{k|k}^j$, is a state estimate value of the $j^{th}$ measurement iteration at k moment, $z_k$ is a measured value output by a phase discriminator of a multi-satellite channel at k moment, h(·) is a measurement equation of a deep coupling tracking loop, $\vartheta_j = x_{k|k}^j - \hat{x}_{k|k-1}$ is an error between a posterior estimate and a priori estimate in the current iteration, $K_j$ is a Kalman gain of the $jt^h$ iteration, $\alpha_j$ is an iterated step-size control coefficient set by accelerating convergence, satisfying $0\alpha_j<1$, $P_{k|k-1}^{-1}$ is an inverse of $P_{k|k-1}$, $P_{xz,k|k-1}$ is an cross-covariance generated during a prediction process, a covariance matrix of state posterior estimation errors takes a result of the last iteration calculation.

* * * * *